United States Patent [19]

Maul

[11] Patent Number: 5,654,685

[45] Date of Patent: Aug. 5, 1997

[54] TIMEKEEPING ARRANGEMENT FOR SPORTING COMPETITIONS

[75] Inventor: Ludwig Maul, Sulzbach-Rosenberg, Germany

[73] Assignee: Diehl GmbH & Co., Nuremberg, Germany

[21] Appl. No.: 361,121

[22] Filed: Dec. 21, 1994

[30] Foreign Application Priority Data

Dec. 22, 1993 [DE] Germany .............................. 9319760 U
May 26, 1994 [DE] Germany .............................. 9408635 U

[51] Int. Cl.$^6$ ................................................ G08B 23/00
[52] U.S. Cl. ................................... 340/323 R; 364/410
[58] Field of Search ................... 340/323 R; 364/410, 364/900

[56] References Cited

U.S. PATENT DOCUMENTS

| 4,142,680 | 3/1979 | Oswald et al. ............. 340/323 R |
| 4,534,012 | 8/1985 | Yokozawa ................... 364/900 |

FOREIGN PATENT DOCUMENTS

| 0 064 787 | 11/1982 | European Pat. Off. . |
| 0 118 141 | 9/1984 | European Pat. Off. . |
| 0 544 277 | 6/1993 | European Pat. Off. . |
| 544 277 | 6/1993 | European Pat. Off. . |
| 9116282.3 | 3/1983 | Germany . |
| WO 93/04446 | 3/1993 | WIPO . |

OTHER PUBLICATIONS

DIEL System Technik, "Pigeon Identification and Racing Real-Time System".

Primary Examiner—John K. Peng
Assistant Examiner—Daryl Pope
Attorney, Agent, or Firm—Scully, Scott, Murphy & Presser

[57] ABSTRACT

A carrier pigeon receives a ring with an electronic transponder which for competition timekeeping can be interrogated when the pigeon arrives at the pigeon loft, by means of a high-frequency field, in order to be able to store the arrival time, associated with that individual pigeon, and later evaluate it for lists of winners. In addition the pigeon carries a conventional ring (which therefore cannot be in any case automatically read off), with the registration number of its organization. There is no relationship between those two sets of data (electronic identity number and conventional organization number), which can confuse and irritate the breeder when associating his pigeons. Therefore, a table is additionally fed into the operating device for contact-less high-frequency interrogation of the identity carrier, in which table the identity numbers and the organization numbers of the pigeons are associated with each other. The display then does not display the electronically detected identity number of the pigeon which has just arrived, but the conventional organization number which is read out of the storage table for that purpose and with which the breeder is more familiar.

4 Claims, 1 Drawing Sheet

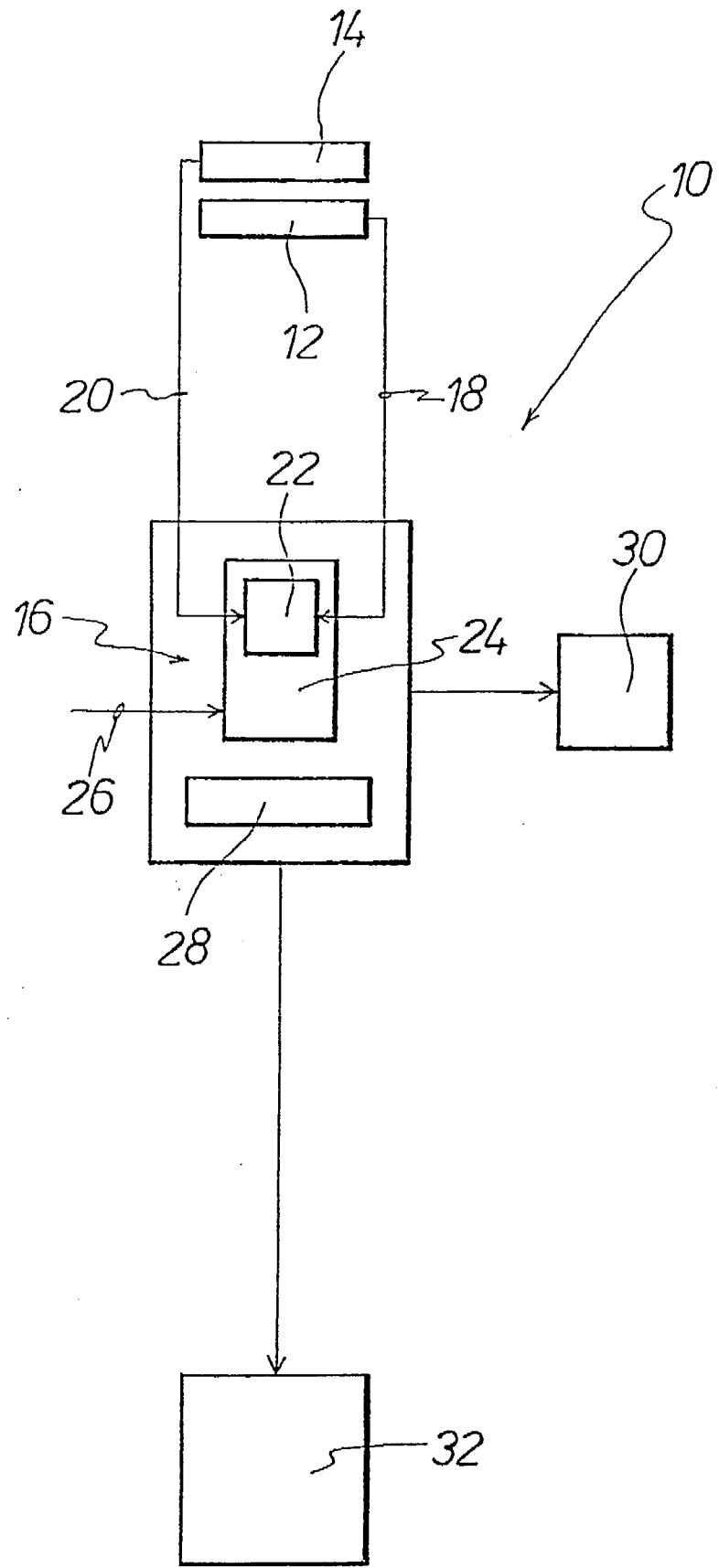

TIMEKEEPING ARRANGEMENT FOR SPORTING COMPETITIONS

BACKGROUND OF THE INVENTION

1. Field of the Invention

The invention concerns a timekeeping arrangement for sporting competitions, in particular for carrier pigeon prize flights, comprising a participant identification carrier which can be interrogated in a contactless mode and a registering means for mutually associated items of competitor and time information. Each competitor is permanently provided with an identification carrier which individualizes the competitor and which includes an individual coded register number which can be activated and interrogated by a reading device and which can be transferred into a storage means.

2. Discussion of the Prior Art

A timekeeping arrangement of that kind is known from the applicants' EP 0 544 277 A2. Each competitor, in that case each carrier pigeon, is permanently equipped with a single co-ordinated register number which occurs only once so that each competitor can be unambiguously identified.

The invention is based on the realization that a timekeeping arrangement of the kind set forth in the opening part of this specification can be developed in such a way as to afford a further increase in the level of safeguard against manipulation while at the same time the usual identification (in particular the pigeon ring which is generally employed) can still be used.

SUMMARY OF THE INVENTION

In a timekeeping arrangement of the kind set forth in the opening part of this specification, in accordance with the invention that object is attained by the features in that a second identification carrier which includes an organization number is provided for the competitor. In accordance therewith each participant is provided with a further identification carrier which in the case of carrier pigeon racing includes an organisation number which also individualizes the pigeon and which is allocated by the organization to which the participant belongs. There is in principle no relationship between the coded register number which visually cannot be perceived and the conventional organization number which can be visually read off. However the association as between the numbers of each competitor can be stored in table form in a storage means, in the course of the coded register number of the competitor being read in. Thus, for the competitors to be entered, an association is made between their register numbers which can be electronically read into an operating device and the organization numbers which are in everyday use. In that way the familiar organization number can be displayed if the coded register number which is just being inductively detected is transmitted from the electronic reader into an operating device. A participant which is not recorded in the table (for example a pigeon from the adjacent pigeon loft) can be easily detected by virtue of the fact that it is indicated by virtue of the absence of a stored organization number, with an item of information which is made up in an entirely different fashion and which is derived from the register number, at the operating device. The display means thereof therefore serves to display an electronically read, decoded, individual register number information unless the association thereof with the organisation number to be displayed is in the storage means.

The table storage means in the operating device is preferably a non-volatile overwritable electronic storage means. Such a configuration for the timekeeping arrangement makes it easily possible to update at any time an association which is currently of interest as between an individual coded electronic register number and an individual organization number. On the other hand the table which is currently to be stored can be read into the operating device only after the state of the storage means has been previously erased, in order to exclude unauthorised manipulation operations during a subsequent competition.

The operating device which is connected on the output side of the antenna reading device for detecting the coded register numbers can desirably also be connected to a printer and/or to a central evaluation computer in order to be able to permanently document or automatically evaluate the results of the competition.

Therefore the advantages which are achieved with the timekeeping arrangement according to the invention, for example in relation to carrier pigeon racing, are in particular also that a breeder can identify his registered pigeons upon electronic detection thereof immediately and without involving roundabout procedures, by means of the familiar organization numbers, as the arrangement identifies each participant which is stored with the association with its organization, directly with the organisation number, on the display means of the operating device.

BRIEF DESCRIPTION OF THE DRAWING

Further details, features and advantages will be apparent from the following description of an embodiment, diagrammatically shown in the drawing in the form of a block circuit diagram, of the timekeeping arrangement according to the invention for sporting competitions, in particular for carrier pigeon prize flights.

DETAILED DESCRIPTION

The single Figure of the drawing shows a timekeeping arrangement 10 for a participant identification carrier 12 which can be interrogated in a contact-less mode and which includes an individual, electronically coded register number. The participant also carries a second identification carrier 14 with the usual organization number. The identification carrier 12 which electronically individualizes the participant can be detected by an antenna reading device and can be transmitted to an operating device 16 which is used as a transportable intermediate storage means, as indicated by the arrow 18.

A table 22 can be inputted into the operating device 16. The table 22 associates the organization number which is to be inputted manually, from the conventional identification carrier 14, with an individual electronic register number of an identification carrier 12, see the arrow 20. The table 22 is stored in an electronic storage means 24 which is a non-volatile storage means which can be erased and which can be enabled for overwriting, as is symbolically indicated by the arrow 26.

The operating device 16 is also provided with a display means 28 which can be an LCD-display. It serves for representation of an item of information which is derived from the decoded individual register numbers when no organisation number association is available for the display, in the table 22.

The reading device for the electronically detectable register numbers can be integrated into the operating device 16, but desirably the latter can be handled separately. The operating device 16 can be connected to a printer 30 and/or central evaluation computer 32, in which respect the printer 30 can be installed for example in the vicinity of a separately operable reading device, for example in the pigeon loft of a pigeon breeder, while the central evaluation computer 32 is operated for example in a club house so that, on the basis of interlinking stored register numbers with items of real-time information, it is possible to provide for a program-controlled winner classification in comparison with the participants or competitors, that is to say carrier pigeons, of other breeders.

A carrier pigeon has a ring with an electronic transponder which for competition timekeeping can be interrogated when the pigeon arrives at the pigeon loft, by means of a high-frequency field, in order to be able to store the arrival time, in association with that individual pigeon, and later evaluate it for lists of winners. In addition the pigeon carries a conventional ring (which therefore cannot be in any case automatically read off), with the registration number of its organization. There is no relationship between those sets of data (electronic identity number and conventional organization number), which can confuse and irritate the breeder when associating his pigeons. Therefore, a table is additionally fed into the operating device for contact-less high-frequency interrogation of the identity carrier, in which table the identity numbers and the organization numbers of the pigeons are associated with each other. The display then does not display the electronically detected identity number of the pigeon which has just arrived, but the conventional organisation number which is read out of the storage table for that purpose and with which the breeder is more familiar.

I claim:

1. A timekeeping arrangement for carrier pigeon prize flight sporting competitions, comprising a first ring worn on the leg of a pigeon participant, said first ring being an identification carrier (12) including an electronic transponder which is interrogated by a remote reading device within a high-frequency field in a contactless mode upon said pigeon arriving at a home location; registering means for mutually associated items of competitor and time information, each pigeon competitor being permanently provided with said identification carrier (12) which individualizes the respective pigeon competitor and which includes an individual coded register number activatable and interrogated by said reading device and which information is transferrable into a memory storage means (24) operatively connected to said reading device, and a second ring worn on said leg of said pigeon participant comprising a second identification carrier (14) which provides an organization number for the pigeon competitor, and which in correlation with said register number which is electronically detected by said reading device, the correlation thereof with the organization number is stored in a table (22) in said memory storage means and readable on display means.

2. An arrangement according to claim 1, wherein there is included a display means (28) for display of an item of information which is derived from said decoded register number when no organization number is associated with the decoded register number in said table, which organization number is displayed at a different location.

3. An arrangement according to claim 1, wherein said memory storage means (24) is provided which is non-volatile but overwritable.

4. An arrangement according to claim 1, wherein a printer (30) and a central evaluation computer (32) for output and further processing of the organization number of the detected competitor are selectively connectable to the memory storage means (24).

* * * * *